Dec. 11, 1945.  W. A. DIMICK  2,390,696

WEIGHING SCALE BEAM

Filed April 28, 1945

INVENTOR
WILLIAM A. DIMICK
BY
Paul L. Kroher
ATTORNEY

Patented Dec. 11, 1945

2,390,696

UNITED STATES PATENT OFFICE 2,390,696

WEIGHING SCALE BEAM

William A. Dimick, St. Johnsbury, Vt., assignor to Fairbanks, Morse & Co., Chicago, Ill., a corporation of Illinois Application April 28, 1945, Serial No. 590,882

3 Claims. (Cl. 265—53)

This invention relates to weighing scale beams and particularly to scale beams having adjustable means for changing the distance between the beam pivots.

Heretofore when a weighing scale is manufactured with a beam provided with fixed pivots, that scale can be used only for weighing operations with the capacity or range of the beam as established by the pivot arrangement therein. In many instances, however, after a scale has seen service in the field in one class of operations it is desirable to use the scale under different conditions, thereby necessitating the installation of a new beam with the pivots in different locations in the beam.

Therefore, the primary object of this invention is to provide a weighing scale beam with means for adjusting the spacing between the beam pivots, which adjustment may be made in the field, and thereby eliminate the necessity for providing an entire new beam outfit under the above conditions.

Other advantages will be apparent from study of the following description read in conjunction with the drawing, in which.

Figure 2:
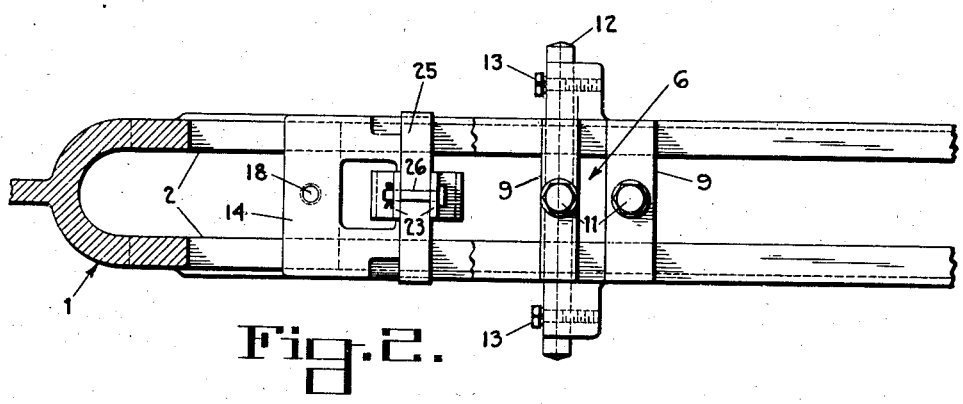
Fig. 2 is a top elevation partly in section, taken on line 2—2 of Fig. 1.
Figure 1:
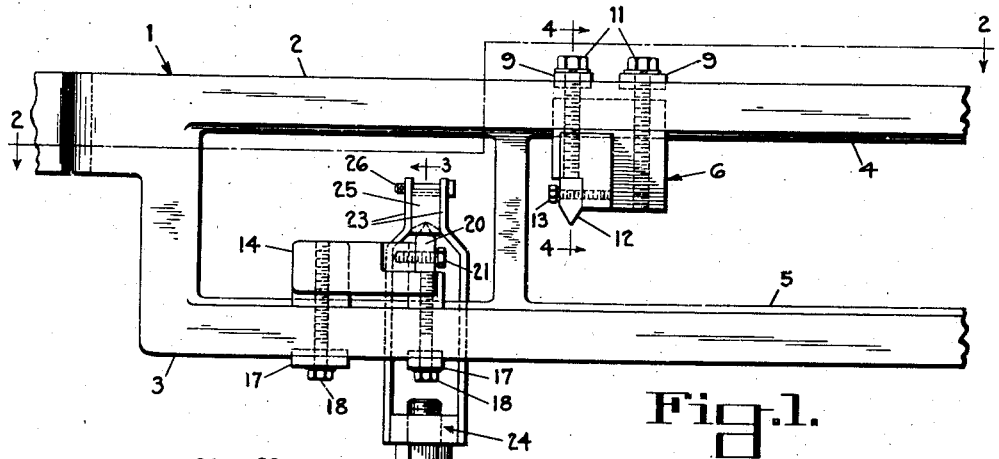
Fig. 1 is a front elevational view of a fragmentary portion of a weighing scale beam, and the adjustable load and fulcrum pivot means of the present invention.
Figure 3:
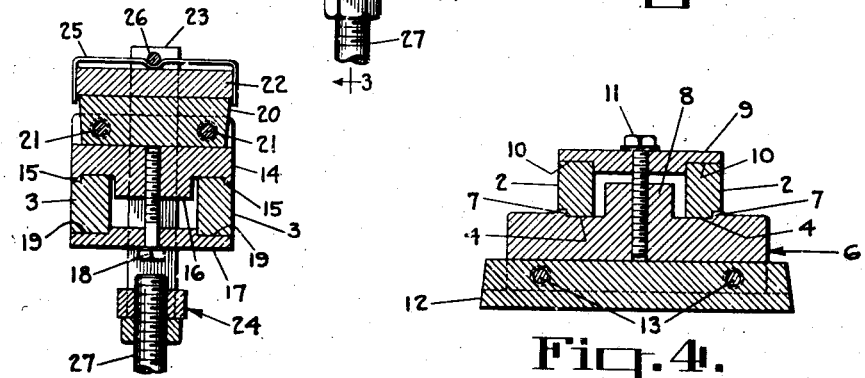
Fig. 3 is a sectional view of the load pivot assembly taken on line 3—3 of Fig. 1.
Figure 4:
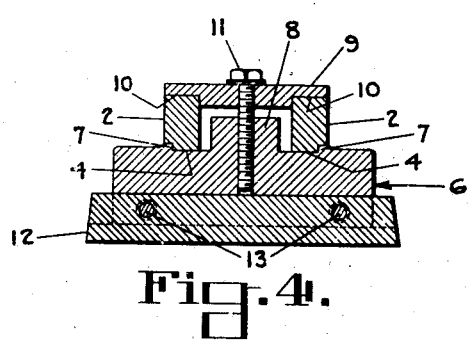
Fig. 4 is a sectional view of the fulcrum pivot assembly taken on line 4—4 of Fig. 1.

Referring to the drawing, numeral 1 refers to a weighing scale beam of the double web type, provided with laterally spaced, parallel bars 2 that define an upper channel, and correspondingly arranged bars 3 that define a lower channel. The under side of the upper channel bars 2 and the upper edges of the lower channels 3 are provided with raised tracks 4 and 5 respectively upon which the fulcrum and load pivot assemblies are adapted to slide.

Mounted against the under sides of the upper channel bars 2 is the fulcrum pivot assembly which is comprised of a fulcrum block 6 of such width as to extend laterally beyond the outer sides of the channel bars 2 while engaging the tracks 4 of the channels. Narrow guide shoulders 7 on the block 6 engage the sides of the tracks 4, and a rectangular boss portion 8 of the block extends upwardly between the channels 2.

A pair of retainer bars 9 extending in spaced relation transversely across the upper surfaces of bars 2 are provided at their ends with machined recesses or guideways 10 for engaging the upper edges of the beam bars 2, and each is provided with an opening through which extends a bolt 11, the bolts entering threaded openings in the boss member 8 of block 6 and thus holding the block tightly against the under side of the channels 2.

The fulcrum pivot 12 is fixedly secured to the block 6 by means such as studs 13, and is adapted to seat in suitable bearings (not shown), mounted on the frame of the scale.

By the described means, when the bolts 11 are loosened the entire unit may be moved longitudinally along the bars 2 of the beam, and when properly located the bolts 11 may be tightened to lock the unit in place.

The load pivot assembly or unit is mounted on the lower channel bars 3 by means similar to those described for the described fulcrum unit. A block 14 is adapted to ride on the tracks 5 on the bars 3 and is provided with guide shoulders 15 for preventing angular displacement of the block. A depending boss member 16 extends between the bars 3 and is connected to a pair of retainer bars 17 by bolts 18, the retainers 17 being provided with guideways 19 for engagement with the lower edges of the channels 3.

The load pivot 20 is secured to the block 14 by means such as studs 21, and is adapted to hold a V-bearing 22 mounted between the arms 23 of a clevis 24. A friction plate 25 extends longitudinally of the bearing 22 and is turned downwardly at the ends to form arms to hold the bearing therebetween. Midway of the plate 25 is formed a horizontal indentation which is adapted to receive a pin 26 mounted between the arms 23 of the clevis 24, thereby providing means for retaining the bearing in place as well as allowing a limited amount of compensating movement.

A draft rod 27 leading to the scale lever system (not shown) is suitably connected to the clevis 24.

By loosening and tightening the bolts 18, the block as well as the complete load pivot unit may be moved to a desired position on channels 3 and locked in place.

What I claim and desire to secure by Letters Patent is:

1. In combination in a weighing scale, a channeled scale beam, an adjustable pivot assembly comprising a block positioned against one horizontal surface of said beam and adapted for adjustment therealong, a retainer bar seating against the opposite horizontal surface of the beam, a clamping bolt extending vertically through the beam and interconnecting said block and retainer bar, and a pivot member secured to said block.

2. In combination in a weighing scale, a scale beam having a pair of horizontally spaced longitudinally extending bar portions, a pivot assembly adapted for longitudinal adjustment on the beam and comprising an elongated block extending across said bar portions, and having a boss projecting vertically therefrom, between said bar portions, said block and said bar portions having interengaging shoulders for preventing angular dislocation of the block relative to the beam, a pair of retainer bars extending across said beam bar portions in opposition to said block, bolts clampingly connecting said retainer bars to said boss portion of said block, and a pivot member secured to said block.

3. In combination in a weighing scale, a scale beam having vertically spaced pairs of horizontally spaced, longitudinally extending bar portions, a fulcrum pivot assembly mounted for adjustment along said upper pair of beam bars and a load pivot assembly mounted for adjustment along said lower pair of beam bars, each of said pivot assemblies comprising a block extending across the inner horizontal surface of the related pair of beam bars and having a boss portion projecting vertically therebetween, said blocks and related beam bars having interengaging shoulders for preventing angular dislocation of the blocks, retainer bars extending across the outer horizontal surfaces of the beam bars in opposition to each of said blocks, bolts extending vertically between paired beam bars, clampingly connecting said blocks to the beam bars, and a pivot element secured to each of said blocks.

WILLIAM A. DIMICK.